United States Patent
Frazier et al.

(10) Patent No.: US 6,459,411 B2
(45) Date of Patent: *Oct. 1, 2002

(54) CLOSE/INTRA-FORMATION POSITIONING COLLISION AVOIDANCE SYSTEM AND METHOD

(75) Inventors: James A. Frazier, Albuquerque, NM (US); Kenneth R. Jongsma, Albuquerque, NM (US); James T. Sturdy, Albuquerque, NM (US)

(73) Assignee: L-3 Communications Corporation, Phoenix, AZ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/223,533

(22) Filed: Dec. 30, 1998

(51) Int. Cl.[7] .............................. G01S 3/02; G01S 13/00
(52) U.S. Cl. .......................... 342/455; 342/30; 701/301; 340/961
(58) Field of Search ....................... 342/357.08, 357.09, 342/455, 30; 340/961; 701/300, 301, 3, 120, 121, 122

(56) References Cited

U.S. PATENT DOCUMENTS

| | | | |
|---|---|---|---|
| 3,750,168 A | 7/1973 | Schrader et al. ............. 343/6.5 |
| 4,782,450 A | 11/1988 | Flax ........................... 364/461 |
| 4,789,865 A | 12/1988 | Litchford .................... 342/455 |
| 4,978,945 A | * 12/1990 | Funatsu ....................... 340/961 |
| 5,043,903 A | * 8/1991 | Constant ...................... 701/300 |
| 5,077,673 A | 12/1991 | Brodegard et al. ......... 364/461 |
| 5,566,074 A | * 10/1996 | Hammer ...................... 701/301 |
| 5,570,095 A | * 10/1996 | Drouilhet, Jr. et al. ..... 342/455 |
| 5,636,123 A | * 6/1997 | Rich et al. .................. 342/455 |
| 5,805,111 A | 9/1998 | Brettner, III et al. ....... 342/455 |
| 5,872,526 A | * 2/1999 | Tognazzini ................. 340/961 |
| 6,072,433 A | * 6/2000 | Young et al. .......... 342/357.08 |
| 6,314,366 B1 | * 11/2001 | Farmakis et al. ........... 701/201 |

FOREIGN PATENT DOCUMENTS

WO    WO 97/32185    9/1997    ........... G01C/23/00

OTHER PUBLICATIONS

Section 2 System Overview—TCAS II Study Guide, Jan. 1993, pp. 2–1 through 2–5.
Introduction to TCAS II, U. S. Department of Transportation, Federal Aviation Administration, Mar. 1990, pp. 1–22.
Felter, Stephen C. et al, "A Relative Navigation System for Formation Flight", IEEE Trans. on Aerospace and Electronic Systems, vol. 33, No. 3, Jul. 1997, pp. 958–967.*
Diefes, Debra et al, "Concept Design for a Low Cost Cockpit Display/Collision Avoidance System for General Aviation Aircraft", Position Location and Navigation Symposium, 1996, Apr. 1996, pp. 352–359.*
Donohue, George, "A Visionary Look at Aviation Surveillance Systems,", IEEE AES Systems Magazine, Oct., 1995, pp. 8–13.*
Boisvert, Robert E. et al, "ADS–Mode S System Overview", Digital Avionics Systems Conf. 1993, Oct. 1993, pp. 104–109.*
Goodwin, Mark et al, "Using GPS for Airborne Formation Control", Proceedings of the ION GPS–93, Sep. 1993, pp. 871–884.*

\* cited by examiner

*Primary Examiner*—Gregory C. Issing
(74) *Attorney, Agent, or Firm*—William R. Bachand; David E. Rogers; Squire, Sanders & Dempsey, LLP

(57) ABSTRACT

A passive Traffic Alert and Collision Avoidance System (TCAS) and method is based on receiving and processing Mode-S transponder messages without the TCAS computer having to interrogate the transponders of the respective aircraft flying in formation (i.e., a passive TCAS). A TCAS computer and Mode-S transponder are used to provide distributed intra-formation control among multiple cells of aircraft flying in formation or close-in. The Mode-S transponder provides ADS-B Global Positioning System (GPS) squitter data to the TCAS computer; the TCAS computer receives and processes the data without having to interrogate the transponders of the multiple cells of aircraft. The method and system allow a safe separation between 2 to 250 aircraft flying in formation at selectable ranges.

58 Claims, 11 Drawing Sheets

CLOSE/INTRA-FORMATION POSITIONING COLLISION AVOIDANCE SYSTEM AND METHOD

I. CROSS-REFERENCE TO RELATED APPLICATIONS

This application is related to co-pending U.S. patent application Ser. No. 09/223,339, filed on Dec. 30, 1998 entitled "Apparatus for Dual Mode TCAS and Intra-Formation Collision Avoidance System."

II. BACKGROUND OF THE INVENTION

The present invention relates generally to the field of avionics for collision avoidance systems (CAS). More specifically, the present invention relates generally to airborne traffic alert and collision avoidance systems and transponders. The collision avoidance system described herein has the capability to position and separate aircraft in a large flight formation in, for example, night/instrument meteorological conditions.

Spurred by the collision of two airliners over the Grand Canyon in 1956, the airlines initiated a study of collision avoidance concepts. By the late 1980's, a system for airborne collision avoidance was developed with the cooperation of the airlines, the aviation industry, and the Federal Aviation Administration (FAA). The system, referred to as Traffic Alert and Collision Avoidance System II (TCAS II) was mandated by Congress to be installed on most commercial aircraft by the early 1990's. A chronology of the development of airborne collision avoidance systems can be found in "Introduction to TCAS II," printed by the Federal Aviation Administration of the U.S. Department of Transportation, March 1990.

The development of an effective airborne CAS has been the goal of the aviation community for many years. Airborne collision avoidance systems provide protection from collisions with other aircraft and are independent of ground based air traffic control. As is well appreciated in the aviation industry, avoiding such collisions with other aircraft is a very important endeavor. Furthermore, collision avoidance is a problem for both military and commercial aircraft alike. In addition, a large, simultaneous number of TCAS interrogations from close-in formation aircraft members generate significant radio frequency (RF) interference and could potentially degrade the effectiveness of maintaining precise position/separation criteria with respect to other aircraft and obstacles. Therefore, to promote the safety of air travel, systems that avoid collision with other aircraft are highly desirable.

In addition the problems described above, it is desirable that aircraft, specifically military aircraft, perform precision airdrops, rendezvous, air refueling, and air-land missions at night and in all weather conditions, including Instrument Meteorological Conditions (IMC) with a low probability of detection. Also, it is desirable that these aircraft be allowed as few as 2 through as many as 250 aircraft to maintain formation position and separation at selectable ranges from 500-ft to 100-nm at all Instrument Flight Rules (IFR) altitudes as described in the Defense Planning Guidelines. Also, the system is to be compatible (primarily because of cost issues) with current station keeping equipment (SKE) systems or they will not be able to fly IMC formation with SKE-equipped aircraft.

Referring to FIG. 1, there is shown a block diagram of a conventional TCAS system. Shown in FIG. 1 are TCAS directional antenna 10, TCAS omni-directional antenna 11, and TCAS computer unit 12, which includes receiver 12A, transmitter 12B, and processor 12C. Also shown are aural annunciator 13, traffic advisory (TA) display 14, and resolution advisory displays 15. Alternatively, the TA and RA displays are combined into one display (not shown). The transponder is comprised of transponder unit 16A, control panel 16B, and transponder antennas 16C and 16D. The TCAS and transponder operate together to function as a collision avoidance system. Those skilled in the art understand that this is merely illustrative of a conventional TCAS. For example, many other configurations are possible such as replacing omni-directional antenna 11 with a directional antenna as is known to those skilled in the art. The operation of TCAS and its various components are well known to those skilled in the art and are not necessary for understanding the present invention.

In a TCAS system, both the interrogator and transponder are airborne and provide a means for communication between aircraft. The transponder responds to the query by transmitting a reply that is received and processed by the interrogator. Generally, the interrogator includes a receiver, an analog to digital converter (A/D), a video quantizer, a leading edge detector, and a decoder. The reply received by the interrogator consists of a series of information pulses which may identify the aircraft, or contain altitude or other information. The reply is a pulse position modulated (PPM) signal that is transmitted in either an Air Traffic Control Radar Beacon System (ATCRBS) format or in a Mode-Select (Mode-S) format.

A TCAS II equipped aircraft can monitor other aircraft within approximately a 20 mile radius of the TCAS II equipped aircraft. (U.S. Pat. No. 5,805,111, Method and Apparatus for Accomplishing Extended Range TCAS, describes an extended range TCAS.) When an intruding aircraft is determined to be a threat, the TCAS II system alerts the pilot to the danger and gives the pilot bearing and distance to the intruding aircraft. If the threat is not resolved and a collision or near miss is probable, then the TCAS II system advises the pilot to take evasive action by, for example, climbing or descending to avoid a collision.

In the past, systems in addition to those described above have been developed to provide collision avoidance for aircraft flying in formation. One type of system is provided by AlliedSignal Aerospace and is known as Enhanced Traffic Alert Collision Avoidance System (ETCAS). The ETCAS provides a normal collision avoidance and surveillance, and a formation/search mode for military specific missions.

The AlliedSignal ETCAS falls short in several ways. First, once an aircraft joins the formation, the ETCAS does not itself or in conjunction with any other on-board system maintain aircraft position and separation within the formation. The ETCAS is simply a situational awareness tool that designates formation members by receiving the Mode 3/A code transmitted from the plane's transponder; the ETCAS does not interface with other aircraft systems to compensate for formation position errors. The ETCAS is actually an aircraft formation member identification and rendezvous system that falls short as a true intra-formation positioning collision avoidance system. Second, the ETCAS Vertical Speed Indicator/Traffic Resolution Alert (VSI/TRA) display does not annunciate relative velocity (range-rate) of the lead formation and member aircraft. The ETCAS is only marginally effective without relative velocity of formation aircraft annunciated on the VSI/TRA display. Hence, the pilot has no relative velocity reference to maintain formation position with the lead aircraft, especially during critical turning maneuvers. Third, the ETCAS formation/search mode technique is wholly based upon active TCAS interrogations. Transponder interrogations and the resulting Mode-S transponder replies significantly increase RF reception interference with a large formation of aircraft and could degrade the effectiveness of maintaining precise position/ separation criteria. In addition, the increased composite level of RF severely inhibits a large formation from covertly traversing airspace undetected.

Another problem is presented in previous systems wherein station keeping equipment (SKE) on existing military aircraft can support a formation of only 16 aircraft.

III. BRIEF SUMMARY OF THE INVENTION

The following summary of the invention is provided to facilitate an understanding of some of the innovative features unique to the present invention, and is not intended to be a full description. A full appreciation of the various aspects of the invention can only be gained by taking the entire specification, claims, drawings, and abstract as a whole.

The present invention describes a system and method of maintaining aircraft position and safe separation of a large aircraft flying formation, such as those types of military formations to perform a strategic brigade airdrop, although it can be used for any aeronautical service involving the application of aircraft formation flying units. The present invention involves the use of a passive Traffic Alert and Collision Avoidance System (TCAS) and Mode-S data link transponder to provide distributed intra-formation control among multiple cells of formation aircraft.

In one embodiment, the present invention comprises a data link Mode-S transponder, which generates and transmits ADS-B broadcast data. Such ADS-B broadcast data contains aircraft position information of the host aircraft. The present invention also includes a passive traffic alert and collision avoidance system (TCAS) computer in communication with the Mode-S transponder. The TCAS receives and processes broadcast data from another data link transponder that is located onboard another aircraft (e.g., a follower aircraft within a cell) to determine relative aircraft position of the host aircraft with respect to the other aircraft.

In a further embodiment of the present invention, a data link Mode-S transponder is in communication with a TCAS computer. The TCAS computer receives and processes the broadcast data from the transponder. The TCAS computer is also in communication with a flight mission computer, which receives the broadcast data from the TCAS computer and generates steering commands based on the broadcast data. The present invention includes a high-speed digital communication link that is operatively connected to the mission computer, which is used to transmit the steering commands to one other transponder-equipped aircraft where the steering commands are processed by the other aircraft. The other aircraft uses the steering commands to position itself with respect to the host aircraft. This can be accomplished either with station keeping equipment or automatic flight controllers.

The method of the present invention includes the steps of providing a transponder (on one or more aircraft), which generates and transmits ADS-B broadcast data to determine relative aircraft position, and providing a TCAS computer onboard a host aircraft. The TCAS is in communication with the transponder and receives and processes ADS-B broadcast data from the transponder. The method includes the step of (automatically) positioning and separating the aircraft with respect to one another while flying in formation based on the broadcast data using, for example, automatic flight or station keeping means. The method further includes the steps of providing a mission computer in communication with the TCAS computer; transmitting the broadcast data from the TCAS computer to the mission computer; processing the broadcast data; and selectively transmitting the processed broadcast data between the aircraft via a high speed data link. The step of processing further includes the step of calculating the target aircraft range, range rate, relative altitude, altitude rate, and bearing from the broadcast (ADS-B) data received from the Mode-S transponder to determine whether an aircraft is intruding upon the air space of the TCAS-equipped aircraft. The step of selectively transmitting is conducted, for example, using a unique flight identifier of the particular aircraft. The method also includes the steps of alerting the pilot of the aircraft when an intruder penetrates a predefined perimeter of aircraft flying in formation and displaying the range rate or relative velocity of the aircraft within a predefined cell or airspace. The method further includes the step of inhibiting air traffic control radar beacon systems (ATCRBS) messages from being sent by the Mode-S transponder.

The present invention is capable of supporting a flight formation of 250 aircraft through distributed control of multiple aircraft formation cell units. It uses a passive surveillance technique for maintaining formation aircraft position within 500-ft to 100-nm of one another at all Instrument Flight Rules (IFR) altitudes. Updated aircraft position information is broadcast periodically (e.g., 2 times per second). These periodic Mode-S transponder transmissions of Automatic Dependent Surveillance Broadcast (ADS-B) information are sent to and received by the TCAS of other TCAS-equipped aircraft. This extended ADS-B data transmission is also referred to herein as Global Positioning System (GPS) or Mode-S squitter. Aircraft positions, relative altitude and velocity are presented on the Vertical Speed Indicator/Traffic Resolution Advisory (VSI/TRA) display (e.g., cathode ray tube or flat panel display) and processed in the aircraft mission computer's intra-formation positioning collision avoidance system (IFPCAS) data fusion center. The mission computer receives data from the TCAS computer, processes the data to obtain, for example, range and range rate, and then the mission computer places the data in a format usable by external equipment such as the station keeping equipment. Steering commands are generated and disseminated to the various or individual formation aircraft. The steering commands are executed using on-board station keeping equipment (which can also be used to maintain helicopter positioning) or autopilot means. The passive surveillance technique of the present invention significantly reduces the range upon which a large aircraft formation can be detected and the resulting lower RF interference maintains uninterrupted position and separation correction updates.

The present invention overcomes several problems, including, but not limited to: providing a means to position and separate aircraft in an extremely large flight formation (e.g., 100 aircraft) in night/instrument meteorological conditions utilizing ADS-B information and high frequency data links (and accompanying antennas) for disseminating intra-formation steering commands; utilizing the aircraft mission computer as a data fusion center for generating steering commands based upon assimilated ADS-B information received from the TCAS; and reducing the amount of RF interference resulting from multiple simultaneous TCAS interrogations and Mode-S transponder replies. The present invention maintains safe separation between 2 to 100 aircraft, and up to 250 aircraft, in night and Instrument Meteorological Conditions (IMC). The present invention enables aircraft position/separation at selectable ranges from 500-ft to 100-nmi at all Instrument Flight Rules (IFR) altitudes. The present invention is an integrated aircraft positioning/separation control solution.

The novel features of the present invention will become apparent to those of skill in the art upon examination of the following detailed description of the invention or can be learned by practice of the present invention. It should be understood, however, that the detailed description of the invention and the specific examples presented, while indicating certain embodiments of the present invention, are provided for illustration purposes only because various changes and modifications within the spirit and scope of the invention will become apparent to those of skill in the art from the detailed description of the invention and claims that follow.

IV. BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

V. DETAILED DESCRIPTION OF THE INVENTION

A passive Collision Avoidance System (CAS) is implemented by the present invention to maintain selectable separation between formation cells and follower aircraft within each cell using an integrated control system. The passive CAS is attained by the present invention using centralized control and decentralized execution of multiple aircraft formation cells. The present invention uses TCAS and Global Positioning System (GPS) Squitter data from a Mode-S transponder. The terms GPS squitter, Mode-S squitter, and ADS-B mean the same thing and are used interchangeably throughout the description of the present invention to describe extended data transmission.

Assembling a large number of formation aircraft (e.g., for a massive size military airdrop in IMC and night flying conditions) is a positioning/separation control problem that is implemented by the present invention in two parts:

1) Modification or augmentation of a conventional TCAS, e.g., Honeywell TCAS-2000 (product no. RT-951), to permit close formation flight without unnecessary traffic advisories or resolution advisories; and 2) Use of data from a Mode-S transponder to process aircraft position, and an external high-frequency (e.g., VHF, UHF) data link (transmitter and receiver), with accompanying antennas, to pass data, such as ADS-B and intraformation steering commands, between aircraft.

Figure 1:
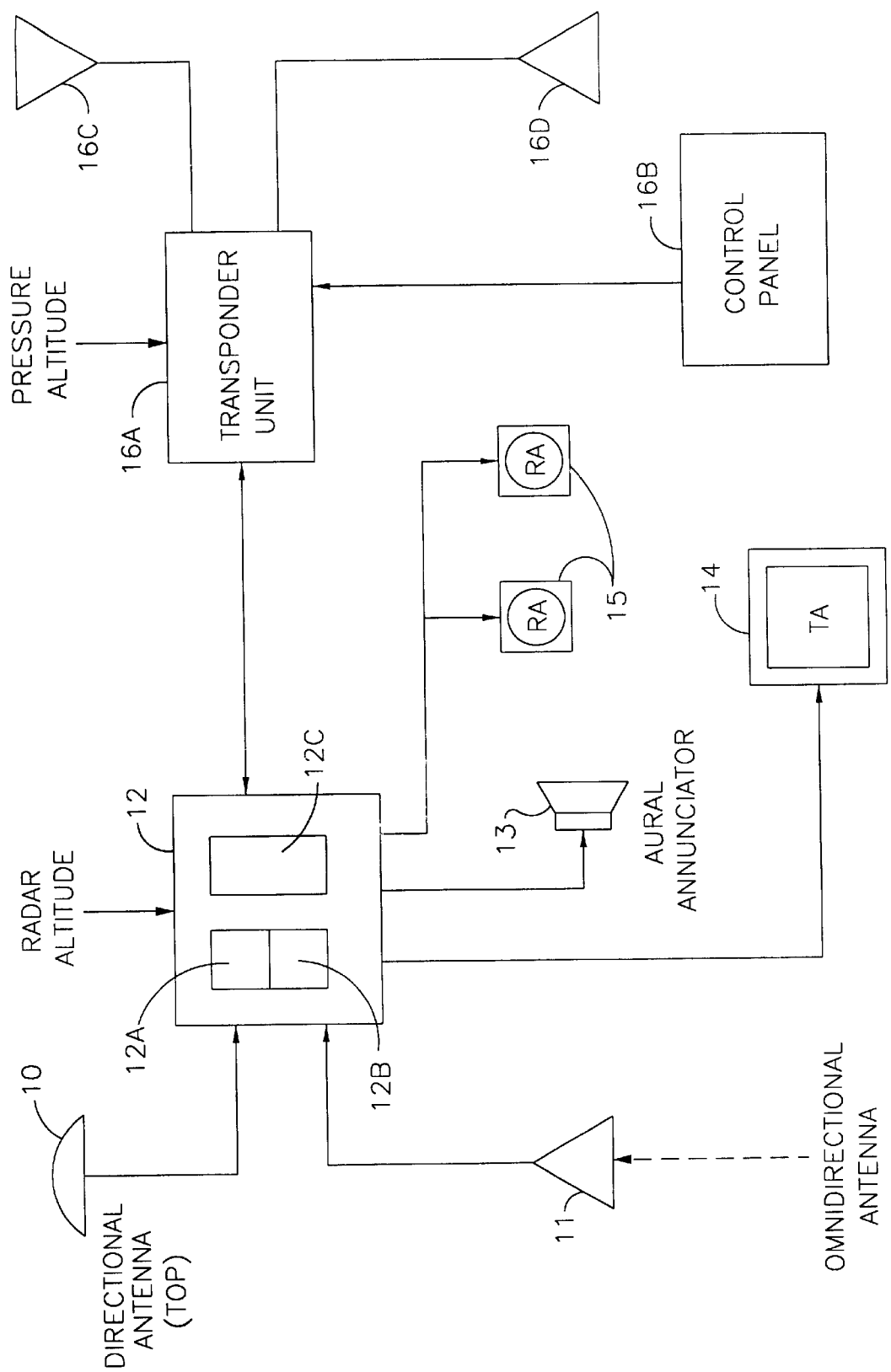
FIG. 1 (prior art) is a block diagram of a conventional TCAS system.
Figure 2:
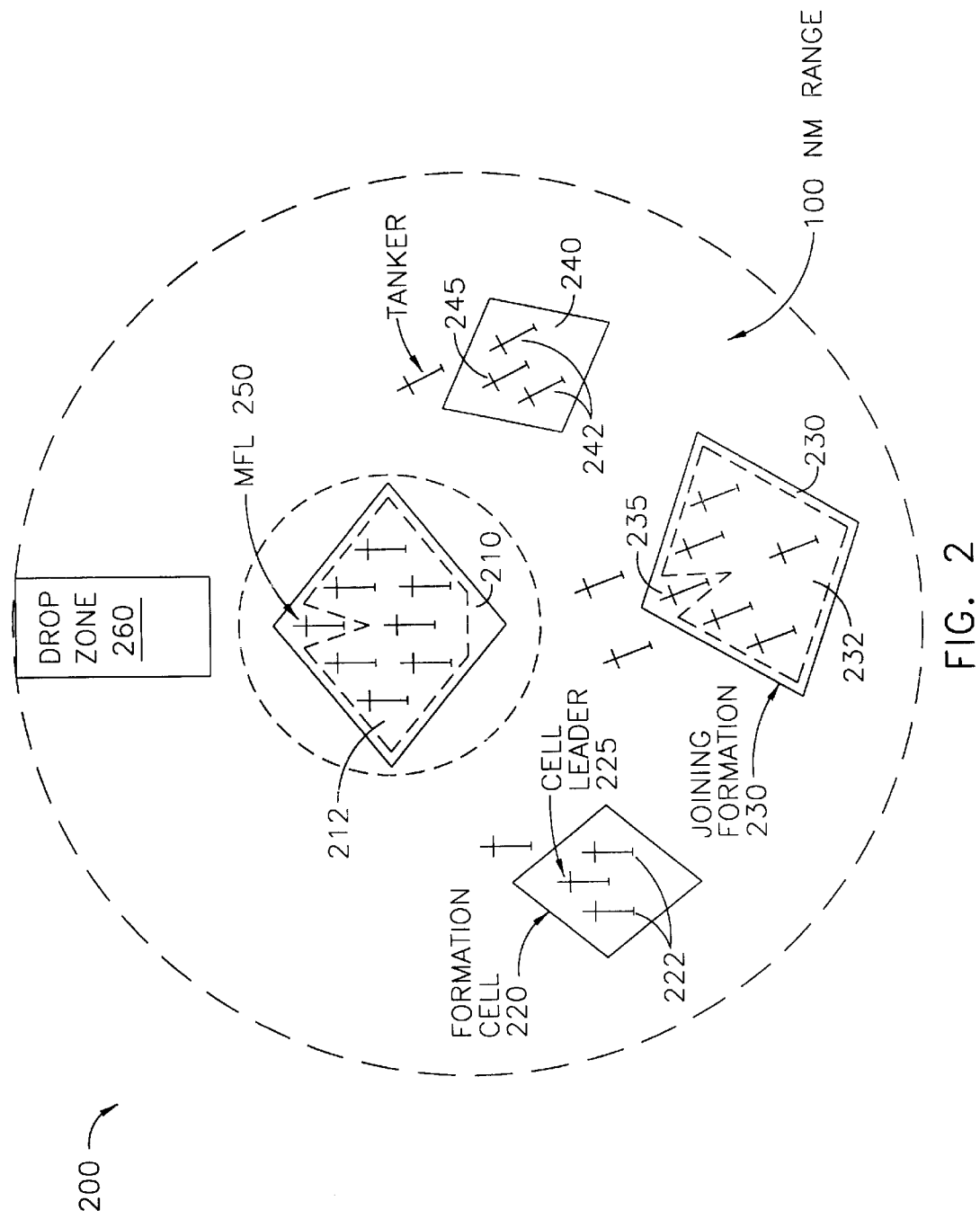
FIG. 2 is a diagram of the components of an exemplary aircraft formation.

Referring to FIG. 2, there is shown an exemplary aircraft formation with its members heading towards a drop zone 260 for which an Intra-Formation Positioning Collision Avoidance System (IFPCAS) is necessary. Adjacent aircraft flying in close proximity to one another but not part of the same cell could maintain a safe separation using passive TCAS detection and processing. A large formation (master cell) 200 can be split into smaller cells (210, 220, 230, 240) with a cell leader (225, 235, 245) responsible for maintaining aircraft separation among cell followers (212, 222, 232, 242). A cell is defined as a smaller formation of approximately 2–50 aircraft. A large formation (up to 250 aircraft) 200 contains many cells within it. A Master Formation Leader (MFL) 250 is responsible for maintaining separation between the multiple cells (210, 220, 230, 240) that make up the entire formation 200 (the MFL acts as a beacon for the formation followers).

The MFL 250 maintains cell separation using information that is periodically broadcast from the cell leader's transponder, specifically, Global Positioning System (GPS) squitter data. The MFL 250 receives the data from each cell leader (225, 235, 245) aircraft. Each cell leader's (225, 235, 245) aircraft is identified by a unique Mode-S 24-bit address. Precise position location of formation cells and other multiple formations could be accurately tracked with GPS squitter data. MFL 250 fuses the data of all cell positions; such data fusion is accomplished in the MFL's Flight Management System (FMS) IFPCAS data fusion center as shown and discussed with respect to FIG. 5. Individual cell steering commands are transmitted via Mode-S data link to cell leader (225, 235, 245) aircraft as shown and discussed with respect to FIG. 4. Steering commands are directed to individual cell leaders by their unique Mode-S 24-bit address. MFL 250, cell leaders (225, 235, 245), and cell followers can be identified by their Mode-S 24-bit address and/or Flight Identification that are assigned to each aircraft and transmitted as part of the existing Mode-S message types.

Cell leaders (225, 235, 245) then process steering commands within their own FMS and disseminate steering commands to their element aircraft within their cell. Individual cell aircraft act upon the steering command if they are addressed to do so via their station keeping system digital datalink with the cell leader. It should be noted that every Mode-S message contains a cyclic redundancy check (24-bit error detection code) to prevent erroneous information from being received by the aircraft.

GPS squitter would also be used in a similar manner to enable multiple formations to interfly and maintain position/separation at selectable distances. In the multiple formations scenario a Super Master Formation Leader (SMFL) receives ADS-B information from the MFLs. The SMFL processes the fused data and disseminates steering commands to formation element master leaders to maintain position and separation between multiple formations.

This distributed formation positioning control approach prevents single point of failure and provides the flexibility of passing MFL 250 and cell leader (225, 235, 245) responsibilities to subordinate formation aircraft.

Figure 3:
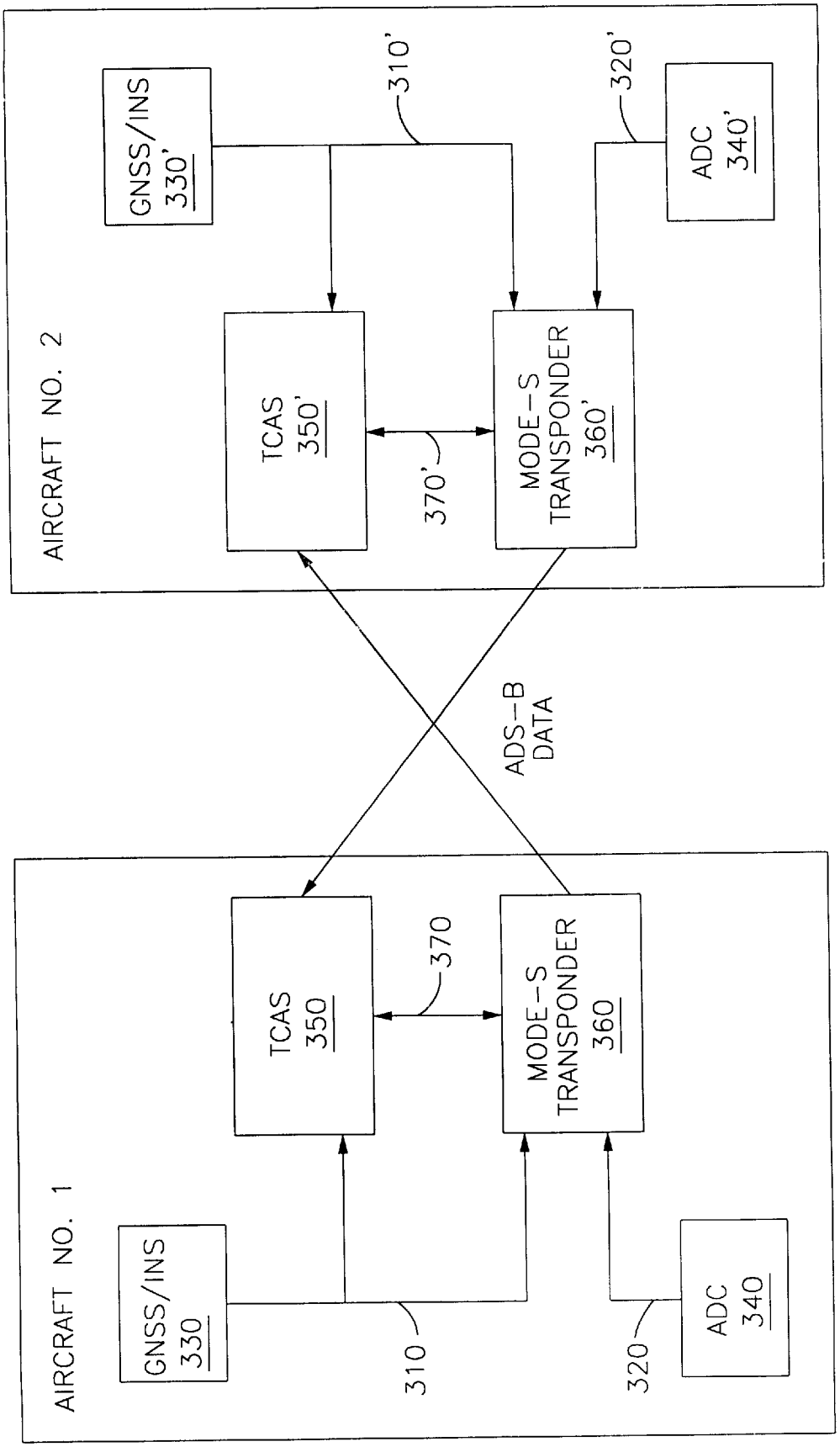
FIG. 3 is a block diagram of an embodiment of the collision avoidance system for close formation flights in accordance with the present invention.

Referring to FIG. 3, there is shown a graphical depiction of the passive surveillance system of the present invention that is used to attain close formation collision avoidance. Passive surveillance as used herein means that a close formation collision avoidance can be attained without active TCAS traffic advisory interrogations. Conventional TCAS operate with active TCAS traffic advisory interrogations. Passive surveillance can be achieved through Mode-S transponder GPS squitter broadcast and subsequent TCAS reception and processing of that data to display aircraft position.

FIG. 3 illustrates an exemplary embodiment of the present invention. Although only two aircraft systems are illustrated, it should be clear to those skilled in the art that multiple aircraft will have a similar relationship to that shown between Aircraft No. 1 and No. 2. In formation, the Aircraft No. 1 would represent the MFL. The operation of TCAS and each component shown are well known in the art and need not be described in detail. Certain traffic control system transponders, such as the Mode-S transponder, include unique aircraft identifiers so that each message from a target aircraft can be stamped with the identity of the target aircraft. ADS-B messages are broadcast from the Mode-S transponder 360 at a predetermined interval, e.g., periodically one or two times per second, and contain the aircraft's geographic coordinates (latitude and longitude), magnetic heading, velocity, intended flight path, barometric altitude, and flight identifier, etc., of the respective aircraft. Such ADS-B data set is derived from aircraft's GPS, Inertial Navigation System (INS), and Flight Management System (FMS) (not shown) via a bus interface, e.g., high-speed ARINC 429-bus interface, and provided to the Mode-S transponder 360. ADS-B data received by the TCAS-equipped aircraft is processed and displayed in the cockpit to better enable a flight crew to assess potential conflicts. The TCAS 350 is manipulated by software to receive the Mode-S squitter information and compute the positions of target proximity aircraft. Target range, range rate, relative altitude, altitude rate, and bearing are calculated from this ADS-B data received from the Mode-S transponder to determine whether an aircraft is intruding upon the air space of the TCAS-equipped Aircraft No. 1. In a formation, only the lead aircraft is permitted to respond to any ground interrogations because of the radio frequency interference and inability of FAA Air Traffic Control to decipher multiple returns in a very small area. From an accuracy point of view, the present invention uses GPS/INS data that is broadcast by an intruding aircraft, which permits an exact calculation of position with no more than 10-m error in most cases instead of a relative positional calculation. The relative altitude, altitude rate, range, and relative velocity (range-rate) are all critical to avoiding a collision in the present invention. Other parameters of the target aircraft are accounted for to derive intent and closure rate.

The TCAS 350 of Aircraft No. 1 receives ADS-B data from the Mode S transponder 360' of Aircraft No. 2 through the Mode-S transponder datalink at a predetermined frequency, for example, 1090 MHz. Similarly, the Mode-S transponder 360 of Aircraft No. 1 transmits ADS-B data to the TCAS 350' of Aircraft No. 2 through its Mode-S transponder datalink. The TCAS 350 is in communication with the Mode-S transponder 360 through bus 370, e.g., ARINC 429-bus interface. The Mode-S transponder 360 provides the TCAS with altitude information of the aircraft, which is derived from the ADC 340. ADS-B data 310, such as latitude, longitude, velocity, intended flight path, etc., are provided from Global Navigation Satellite System/Inertial Navigation System (GNSS/INS) 330 to the TCAS 350 (through the Flight Management System (FMS), which is not shown) and to the Mode-S transponder 360. ADS-B data 320, such as altitude, is provided from the Air Data computer (ADC) 340 to the Mode-S transponder 360.

The ADS-B messages referenced herein are comprised of five "extended length" squitter messages: (1) Extended squitter airborne position; (2) Extended squitter airborne velocity; (3) Extended squitter surface position; (4) Extended squitter aircraft identification; and (5) Event-driven squitter. For formation flying, the present invention primarily uses message formats (1) and (2) for passive airborne implementations and are discussed in the following paragraphs. Additional information regarding these ADS-B messages can be found in AEEC (Airlines Electronic Engineering Committee) ARINC (Aeronautical Radio, Inc.), Circulation of Draft 2 of Project Paper 718A, "MARK 4 AIR TRAFFIC CONTROL TRANSPONDER (ATCRBS/MODE-S)," Sept. 12, 1997.

The extended squitter airborne position message is emitted only when the aircraft is airborne. The extended squitter airborne position message contains position information derived from the aircraft navigation aids (GPS and INS). The extended squitter for airborne position is transmitted as Mode-S Downlink Format Message 17 (DF 017), which is a format known to those skilled in the art. The message is emitted twice per second at random intervals that are uniformly distributed over the range 0.4 to 0.6 seconds relative to the previous extended squitter airborne position emission.

The extended squitter airborne velocity message is emitted only when the aircraft is airborne. The extended squitter airborne velocity message contains velocity information derived from aircraft navigation aids (GPS, INS). The extended squitter airborne velocity message is transmitted as Mode-S Downlink Format Message 17 (DF 017), which is a format known to those skilled in the art. The message is emitted twice per second at random intervals that are uniformly distributed over the range 0.4 to 0.6 seconds relative to the previous extended squitter airborne velocity emission.

It is important to note that the TCAS 350 is operating in a passive mode, i.e., instead of actively interrogating other aircraft it is receiving and processing data. Under conventional TCAS operations, the TCAS and Mode-S transponder share resolution advisory information, or sometimes called coordination messages, when the TCAS is operating in the active interrogation mode. In the present invention, the active interrogation of the TCAS is disabled when in its formation flying mode.

Broadcast Mode-S squitter data is not only key to tight formation collision avoidance, but also key to effectively controlling the relative position of cellular formation units within the larger formation group. The intra-formation positioning system presented herein is based upon a distributed formation cell control scheme that utilizes Mode-S transponder ADS-B squitter, TCAS ADS-B information processing, mission computer target track processing, and the resident aircraft SKE. In this approach, a MFL maintains cell positioning using the ADS-B information that is periodically broadcast from the cell leader's Mode-S transponder.

Figure 4:
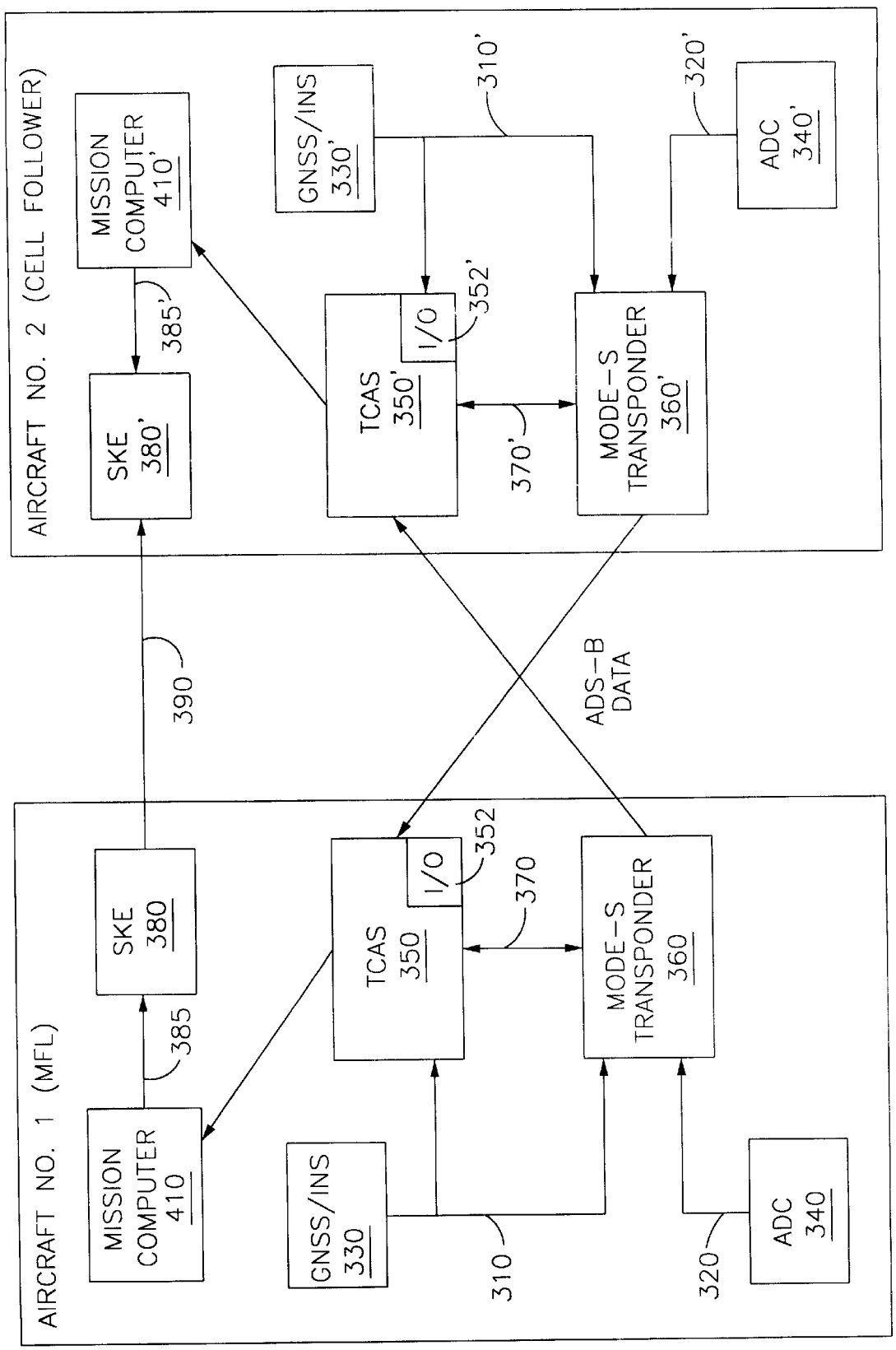
FIG. 4 is a block diagram of an alternate embodiment of the collision avoidance system for intra-formation positioning flights in accordance with the present invention.
Figure 5:
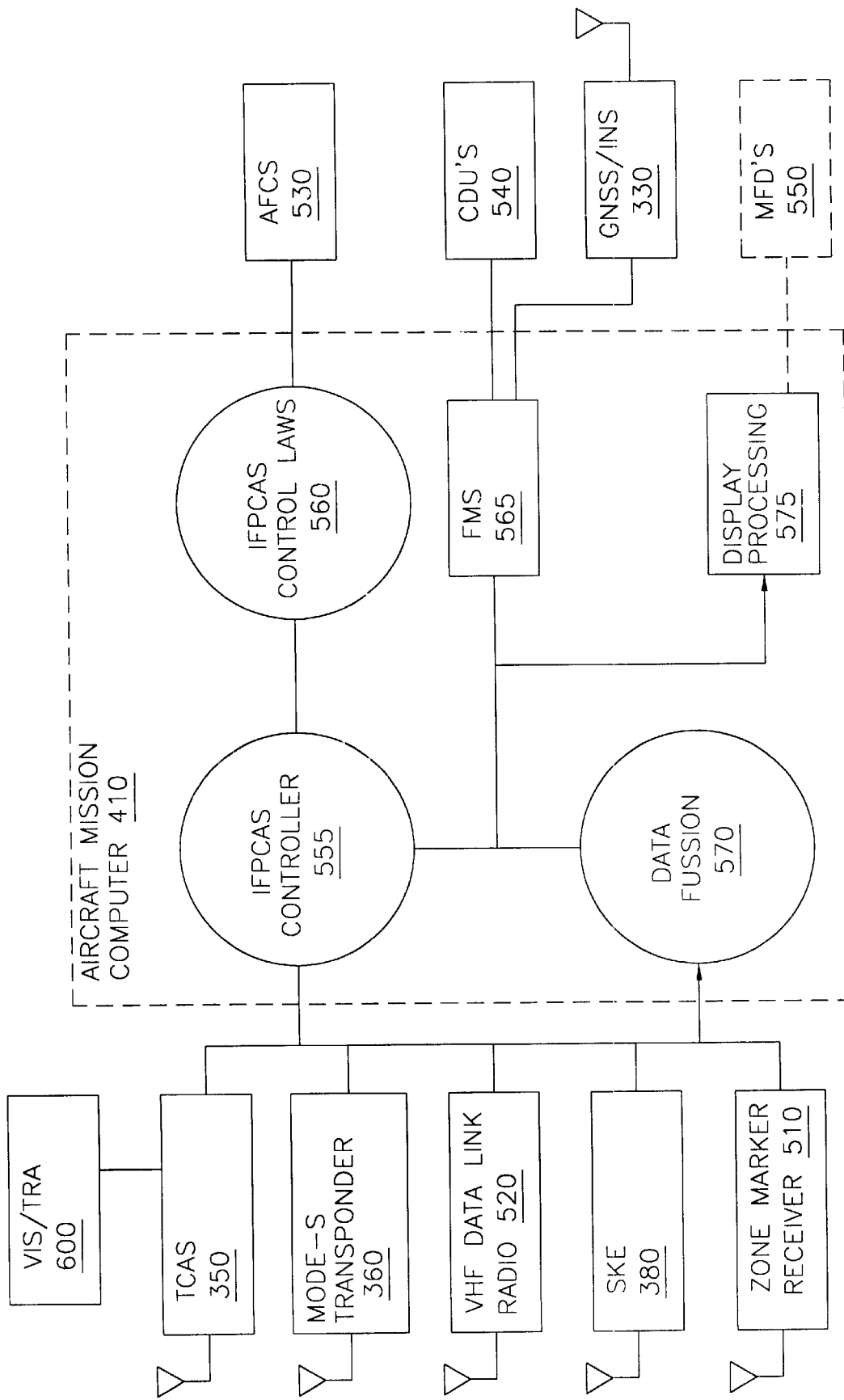
FIG. 5 is a more detailed block diagram of the embodiment of FIG. 4 (the intra-formation collision avoidance system architecture) in accordance with the present invention.

Referring to FIG. 4, there is shown an alternate embodiment of the present invention when operating in the IFPCAS mode. A mission computer 410 and SKE 380 communicate with the TCAS 350 as had been described earlier with respect to FIG. 3. Suitable SKE include products AN/APN-169C or AN/APN-240 available from Sierra Research, a division of Sierra Technologies Inc., although details of the SKE are not necessary for an understanding of the present invention. A higher level diagram of this system architecture is shown in FIG. 5.

Although only two aircraft are illustrated in FIG. 4, an extremely large formation (e.g., 250 aircraft) consisting of multiple formation units would operate in a similar manner. A passive surveillance approach could be equally effective in enabling multiple formations to interfly and maintain formation position/separation at selectable distances from 500 ft to 100 nmi at all IFR altitudes. In this scenario, a "Super MFL" will receive MFL ADS-B position information and generate steering commands that will be disseminated in a hierarchical manner as described above.

A Master Formation Leader (see, e.g., MFL of FIG. 2) communicates with a cell follower. The TCAS 350 provides the mission computer 410 a full set of ADS-B derived track data. The mission computer 410 selects formation cell leaders by the aircraft's unique 24-bit Mode-S address. Cell unit position and separation information are calculated by the on-board mission computer 410 with the resultant steering commands disseminated to the cell formation leaders via high frequency data link 390. Steering commands are forwarded from the high frequency receive suite to the cell leader's mission computer 410', which in turn, forwards them to the SKE 380'. The mission computer 410 provides aircraft guidance commands to its SKE 380 via bus 385 based on the data received from the TCAS 350. Follower aircraft then execute the cell leader's SKE commands, which may involve a variety of commands such as pitch, roll and thrust to maintain the position in the formation. The system architecture shown in FIG. 5 is illustrated with the IFPCAS Controller, Data Fusion, and Control Laws implemented in the mission computer 410 as software functions or a separate VME processing card. Multi-function Displays (MFDs) 550 could be used as an alternative to the TCAS VSI/TRA display 600 to display the formation CAS information. The MFD could display the TCAS targets displayed on them instead of or in addition to the VSI/TRA 600.

It is important to note that the selection of formation members can be accomplished using the unique 24-bit Mode-S address that is broadcast at the tail end of each GPS squitter transmission. In addition, a secondary means of member selection can be attained using the Flight ID, which is also transmitted as part of the Mode-S extended length message.

Non-station keeping aircraft formations (e.g., tanker cell formations) can be handled in a similar manner. In fact, TCAS-equipped tankers can utilize Mode-S ADS-B information to rendezvous with specific formation aircraft using the selective 24-bit address or Flight ID transmitted in the Mode-S squitter message. Such non-station keeping aircraft could maintain position and separation within the formation unit by receiving Mode-S squitter ADS-B data from the MFL and/or cell leader aircraft and reconfiguring the aircraft's mission data to comply with the Mode-S squitter ADS-B data. Similarly, rendezvous aircraft guidance commands could be generated by their mission computers using serviced aircraft's ADS-B track data. This is another example where the unique Mode-S address can be used to selectively track a specific formation member aircraft.

Referring to FIG. 5, there is shown an embodiment of the IFPCAS architecture in accordance with the present invention. Strategic Brigade Airdrop (SBA) carrying aircraft will simply fly themselves to the VSI/TRA displayed ground target/drop zone using the positional methodology discussed above. The aircraft mission computer 410 is comprised of IFPCAS Controller 555 subject to IFPCAS Control Laws 560, FMS 565, Data Fusion 570, and Display Processing 575.

The Data Fusion element 570 interfaces with peripheral (digital) datalink equipment to collect data available from the TCAS 350, Mode-S Transponder 360, VHF Data Link Radio 520, SKE 380, and Zone Marker Receiver 510. The data collected is Automatic Dependent Surveillance (ADS) data, Station Keeping Equipment (SKE) data, and Traffic Alert and Collision Avoidance System (TCAS) and Mode-S data. ADS data is received from other aircraft within line of sight range of this aircraft as well as from Air Traffic Control (ATC) ground stations. SKE data is received from other aircraft currently in formation with this aircraft. TCAS/Mode-S data is received from other aircraft within line of sight range of this aircraft as well as from ATC ground stations.

Because this data is obtained from multiple independent sources, it represents different views of the position and state of this aircraft relative to other adjacent aircraft. The total set of data collected will contain duplicate data and possibly some contradictory data. Data fusion algorithms (details are not necessary for understanding the present invention) are used to correlate this total set of data into logical and consistent subsets of information that eliminate duplicate data and resolve contradictory data. Several subsets are involved: a subset for aircraft currently in formation with this aircraft; a subset for aircraft in adjacent or joining formations; and a subset for aircraft in the line of sight range of this aircraft, but not associated with the intra-formation. Each subset of information will contain identification data, position data, intent data, threat priority data, and intra-formation data for each aircraft.

The IFPCAS Controller 555 interfaces with peripheral datalink equipment to determine their current modes of operations. The IFPCAS Controller 555 element receives crew command inputs and data fusion information to determine which IFPCAS functions to activate. During intra-formation operations, the IFPCAS Controller 555 responds to crew inputs and activates Control Laws 560 to fly the aircraft in formation using data fusion information. Additionally, the IFPCAS Controller 555 interfaces with the FMS 565 passing it control data for flight plan changes coordinated among other aircraft in the intra-formation. Also, the IFPCAS Controller 555 responds to crew inputs to enable or minimize RF emissions by sending control data to the Mode S Transponder 360 and TCAS 350. This will minimize the ability of enemy forces to detect this aircraft in or near war zones during military operations.

The IFPCAS Control Laws 560 are control laws that use the Data Fusion information and IFPCAS Controller 555 inputs to process control law algorithms that compute airspeed, altitude, heading, and throttle targets for the Automatic Flight Control System (AFCS) 530 in a manner apparent to those skilled in the art. Because the control laws of conventional TCAS are known by those skilled in the art, the control laws of the present invention are similarly implemented by those skilled in the art while also accounting for external equipment such as the SKE. The AFCS 530 is a conventional aircraft automatic flight control system that provides flight director, autopilot, and autothrottle control functions. The AFCS 530 receives airspeed, altitude, heading, and throttle targets from the IFPCAS Control Laws element 560 to control this aircraft within the intra-formation. These targets are used to keep the aircraft in formation with other aircraft and to maintain the crew-entered separation distances.

The Control Display Units (CDUs) 540 are interfaces used by an operator to input flight parameters into the FMS 565. The FMS 565 is a conventional aircraft flight management system that provides flight plan routes, and lateral and vertical guidance alone those routes. The FMS 565 receives control data from the IFPCAS Controller 555 to accomplish coordinated flight plan route changes among all aircraft within the intra-formation.

The Display Processing 575 element is a conventional display processing function that presents information to the flight crew on, for example, multi-function displays (MFDs) 550. The Display Processing 575 element receives display data from the IFPCAS Controller 555 and Data Fusion 570 functions. This data is an integrated set of Cockpit Display of Traffic Information (CDTI) that provides a clear and concise presentation of the adjacent traffic for improved situational awareness.

Figure 6:
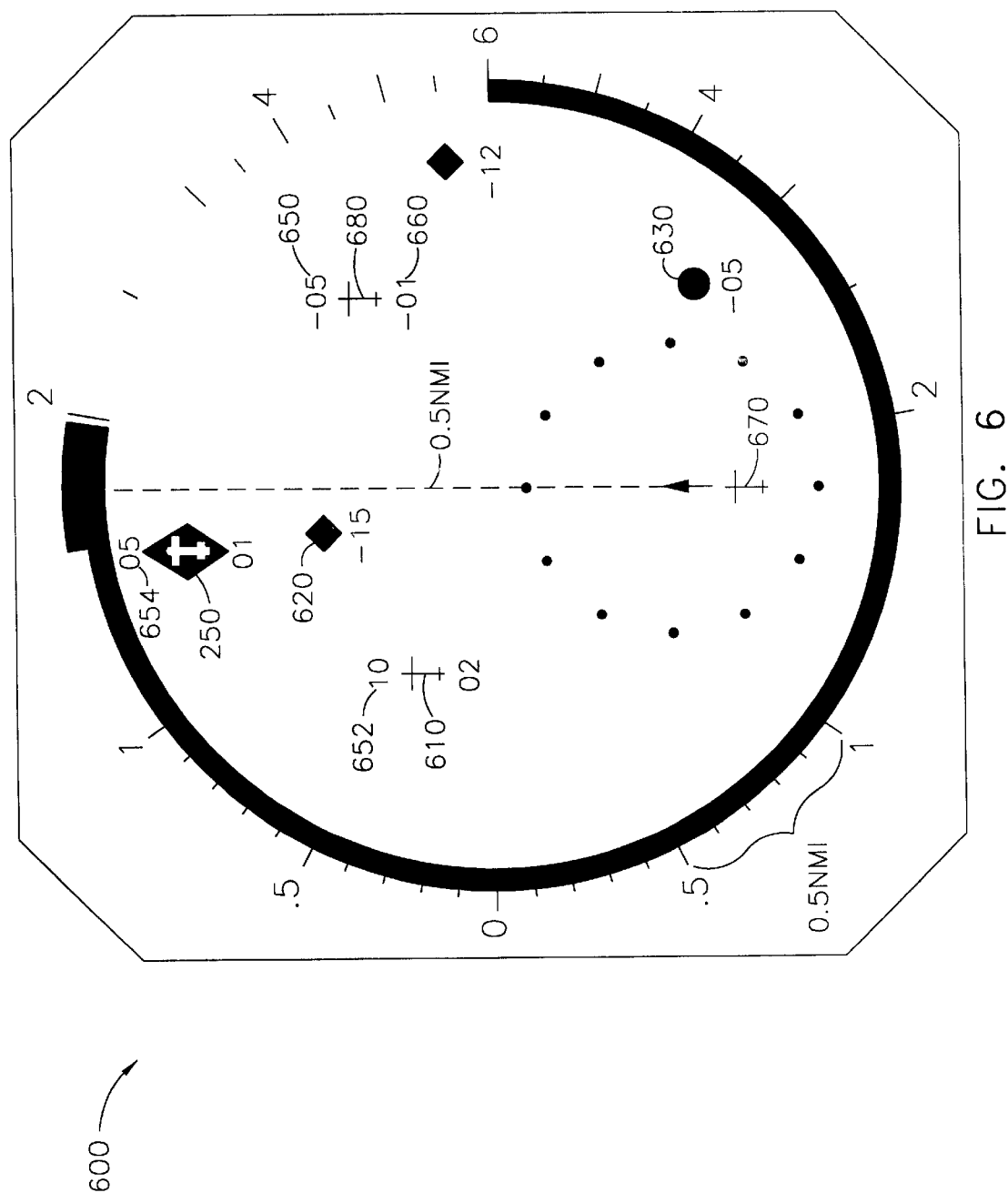
FIG. 6 is an elevation of a TCAS VSI/TRA display with the relative velocity (range rate) of formation aircraft displayed in accordance with the present invention.

Non-formation military and civilian aircraft that are capable of receiving TCAS ADS-B data can see formation aircraft targets on their VSI/TRA 600 (see FIG. 6). Because formation aircraft are not passing resolution advisories it will be the responsibility of the non-formation aircraft to maneuver out of the way.

The TCAS 350 receives and processes the ADS-B information and displays relative aircraft position (range, bearing, and altitude) on the Vertical Speed Indicator/Traffic Resolution Alert (VSI/TRA) display 600. When the TCAS of the present invention is configured for IFPCAS mode, resolution advisories are inhibited because of the close proximity of aircraft within the cell. Of course, the prior art systems teach away from this feature of the present invention because resolution advisory is desired in those other collision avoidance situations.

Zone marker receiver 510 emulates GPS squitter broadcasts from a Mode-S transponder 360, which are key to ensuring precision airdrops. The TCAS 350 could designate the zone marker with unique symbology as described herein. Zone marker receiver 510 updates 100-nmi out appear feasible. However, it will be dependent upon the RF transmit power levels that can be tolerated for various mission scenarios.

The Honeywell TCAS-2000 (e.g., RT-951) and Mode-S Transponder (e.g., XS-950) can meet the unique intra-formation positional requirements described herein with some modifications to the TCAS-2000 unit. These changes will be discussed in the following paragraphs.

A modified or augmented TCAS-2000 is a preferable TCAS (being that it is the most recent product) but other TCAS systems can be adapted and used as well in a manner well known to those skilled in the art. The TCAS-2000 is a new Traffic Alert and Collision Avoidance System and is available from Honeywell, the company that also developed the TCAS II. Standard (i.e., before modification as described herein) TCAS 2000 features include: increased display range to 80 nautical miles (nm) to meet Communication, Navigation, Surveillance/Air Traffic Management (CNS/ATM) requirements; variable display ranges (5, 10, 20, 40 and 80 nm); 50 aircraft tracks (24 within five nm); 1200 knots closing speed; 10,000 feet per minute vertical rate; normal escape maneuvers; enhanced escape maneuvers; escape maneuver coordination; and air/ground data link.

By way of illustration and not by limitation, an input/output (I/O) card 350 is added (in, for example, an existing spare card slot) in the TCAS-2000 computer in addition to its other components as shown in FIG. 4. This I/O card 350 provides the ADS-B data interface from the TCAS-2000 computer to the aircraft mission computer 410. In addition, the TCAS 350 derives its present position, altitude, and airspeed from GNS/INS. Such information is accommodated using this I/O card 352 to interface with the aircraft's GPS receiver and INS systems (330). The I/O card 352 accommodates an ARINC 429 interface to the GNSS/INS 330 so the TCAS can establish its own geographical position and airspeed reference. The TCAS receives altitude data from the Mode-S Transponder via a high-speed ARINC 429 data bus. These parameters are necessary in order to precisely calculate exact range, range-rate, bearing and relative altitude of adjacent cell formation aircraft.

A modification to the TCAS-2000 Computer Processing Unit card (not shown) is needed to decrease the average filtered range error from approximately 72 feet to 50 feet. Also, a modification to the Control Panel is needed to add the IFPCAS mode selection option and to add the 0.5 nmi range selection option.

A preferable Mode-S transponder is the Honeywell Mode-Select (Mode-S) Data Link Transponder (product no. XS-950), which is a "full-feature" system implementing all currently defined Mode-S functions—but with built-in upgradeability for future growth. As will become apparent to those skilled in the art, other Mode-S transponders can be used in the present invention. Current Mode-S transponders are used in conjunction with TCAS and ATCRBS to identify and track aircraft position, including altitude. The Mode-S Data Link Transponder XS-950 product transmits and receives digital messages between aircraft and air traffic control. It meets all requirements for a Mode-S transponder as described in DO-181A, including Change 1. The unit also conforms to ARINC Characteristic 718 with interfaces for current air transport applications. The Mode-S transponder is capable of transmitting and receiving extended length Mode-S digital messages between aircraft and ground systems. The data link provides more efficient, positive, and confirmed communications than is possible with current voice systems.

Modifications to the conventional Mode-S transponder are required by the present invention to inhibit Air Traffic Control Radar Beacon System (ATCRBS) interrogation replies while in the IFPCAS operational mode. To further reduce RF emission levels, the present invention further comprises an external RF power step attenuator, which requires a change to the TCAS RF board. The Mode-S RF power transmission level is 640 watts peak pulse, 250 watts minimum. An external attenuator controlled from the pilot's station reduces emission levels for close proximity aircraft, contributes to reducing probability of detection, and reduces the chance of adjacent aircraft L-Band receiver desensitization. Only the formation cell leader (e.g., 225 in FIG. 2) will transmit at higher Mode-S squitter power levels to ensure positive formation positional control with the Master Formation Leader (250 in FIG. 2). No modification to the Honeywell XS-950 Mode-S transponder is required to broadcast GPS Squitter data because it is already Mode-S, ICAO Level 4 capable (i.e., transmits and receives 16-segment extended length (112) bit messages).

In addition to hardware modifications to the commercially-available TCAS 2000 (or other TCAS product), software modifications to it and to the Mode-S ADS-B systems are contemplated for the present invention to reduce the number of unnecessary evasive maneuvers and allow close formation flying. The modifications include, for example, a GPS Squitter capability enhancement to the commercially-available Honeywell Mode-S transponder product no. XS-950. The IFPCAS mode will be added to the existing software. This unique TCAS mode of operation will provide pilot/operator situational awareness when flying in a formation of multiple TCAS-equipped aircraft. Differences between the IFPCAS mode of the present invention and the conventional TCAS operation mode include, but are not limited to: TCAS Interrogation inhibited; VSI/TRA display of intruders with visual/aural indication of when an intruder penetrates a protected volume or meets some closure rate criteria within a protected volume; centered (or some positioning) VSI/TRA display with approximately 0.5 nmi selection range (see FIG. 6) appropriate sized range ring (e.g., 500 feet) on VSI/TRA display (see FIG. 6); intruder range quantization of a predetermined distance (e.g., 70 feet) and filtered to provide resolution of a predetermined distance (e.g., 50 feet); additional annunciation of relative velocity and formation member identification (see FIG. 6); shutoff interference limiting logic; changes necessary to interface with a GNSS/INS; new data recorder parameters; and modify Mode-S Transponder software code to inhibit Air Traffic Control Radar Beacon System (ATCRBS) response by follower aircraft (only the MFL will have the transponder enabled). All of these changes are well within the skill of those skilled in the art and their implementation will be apparent to them.

Both TCAS-2000 GPS Squitter data processing and Mode-S extended length message ADS-B data transmission will be implemented as part of TCAS-2000 Change 7 software modification in accordance with the present invention as described above. The existing commercial TCAS-2000 system can be modified operation. Normal TCAS Traffic Advisory/Resolution Advisory (TA/RA) capability would be inhibited to prevent aircraft interrogations and resolution advisory operation.

Software in the transponder is completed and certified to DO-178B, the FAA requirement for software development and certification. Software updates can be completed on-board the aircraft by means of, for example, an ARINC 615 portable data loader, which has a data loader port located on the front connector. All of the foregoing software modifications are well within the skill of those skilled in the art and their implementation need not be discussed in detail.

Referring to FIG. 6, there is shown a Vertical Speed Indicator/Traffic Resolution Advisory (VSI/TRA) (or Traffic Advisory/Resolution Advisory) display 600 in accordance with the present invention. FIG. 6 illustrates an exemplary VSI/TRA display 600 with formation and non-formation members identified, such as formation cell aircraft (depicted as airplane icons), lead formation aircraft 250 (depicted as an airplane icon inside a diamond), and non-formation aircraft (depicted by blue diamonds 620 and an amber circle 630). The VSI/TRA display 18 can also show different symbology for formation, tanker, non-formation aircraft, etc.

As shown in FIG. 6, the TCAS VSI/TRA display of the present invention not only shows the relative altitude 660 to the TCAS-equipped aircraft 670 (depicted as an airplane icon inside the dotted range ring 640) but annunciates the relative velocity 650 (or range-rate) of the TCAS-equipped aircraft 670 with the formation lead 250 and follower aircraft (610, 680). Own aircraft position is represented by the aircraft icon 670 at the bottom of the display headed toward the twelve o'clock position. The number (−05) on top of the airplane icon 680 represents the relative velocity (650, 652, 654) in, for example, nmi/hr and the number below the targets (e.g., 660 pointing to −01) represent the relative altitude in, for example, thousands of feet. A negative number indicates that the target aircraft (250, 610, 680) is traveling at a lower velocity than the TCAS-equipped aircraft 670 while a positive number indicates that the target aircraft (250, 610, 680) is traveling at a higher velocity than the TCAS-equipped aircraft 670. This enhancement makes the TCAS a value-added instrument for the pilot flying in tight formation profiles. Relative velocity annunciation will be particularly useful for maintaining aircraft relative position within a formation during turning maneuvers. A conventional TCAS is aware of intruder range and range-rate but today it displays only color warnings when the intruder's relative velocity presents a threat. The TCAS display of the present invention operating in intra-formation mode displays formation cell aircraft relative velocity (650, 652, 654); relative velocity is displayed digitally along with the relative altitude data on the TCAS display 600.

With instantaneous knowledge of the relative speed of each aircraft in a formation, any crew can immediately correct their speed to match the lead aircraft or communicate with an adjacent aircraft if it is flying off formation speed. Once speed is under better control, it becomes possible for all the aircraft in formation to fly coupled to their flight management system, thus ensuring each aircraft flies the same track. The TCAS display 600 of the present invention, which is augmented with relative velocity, should eliminate nearly all of the variation in range, significantly reduce crew workload and enhance safe effective large cell formations in IMC.

The method of the present invention follows the above description of the systems embodiments and is described in the Summary of the Invention section.

Figure 7:
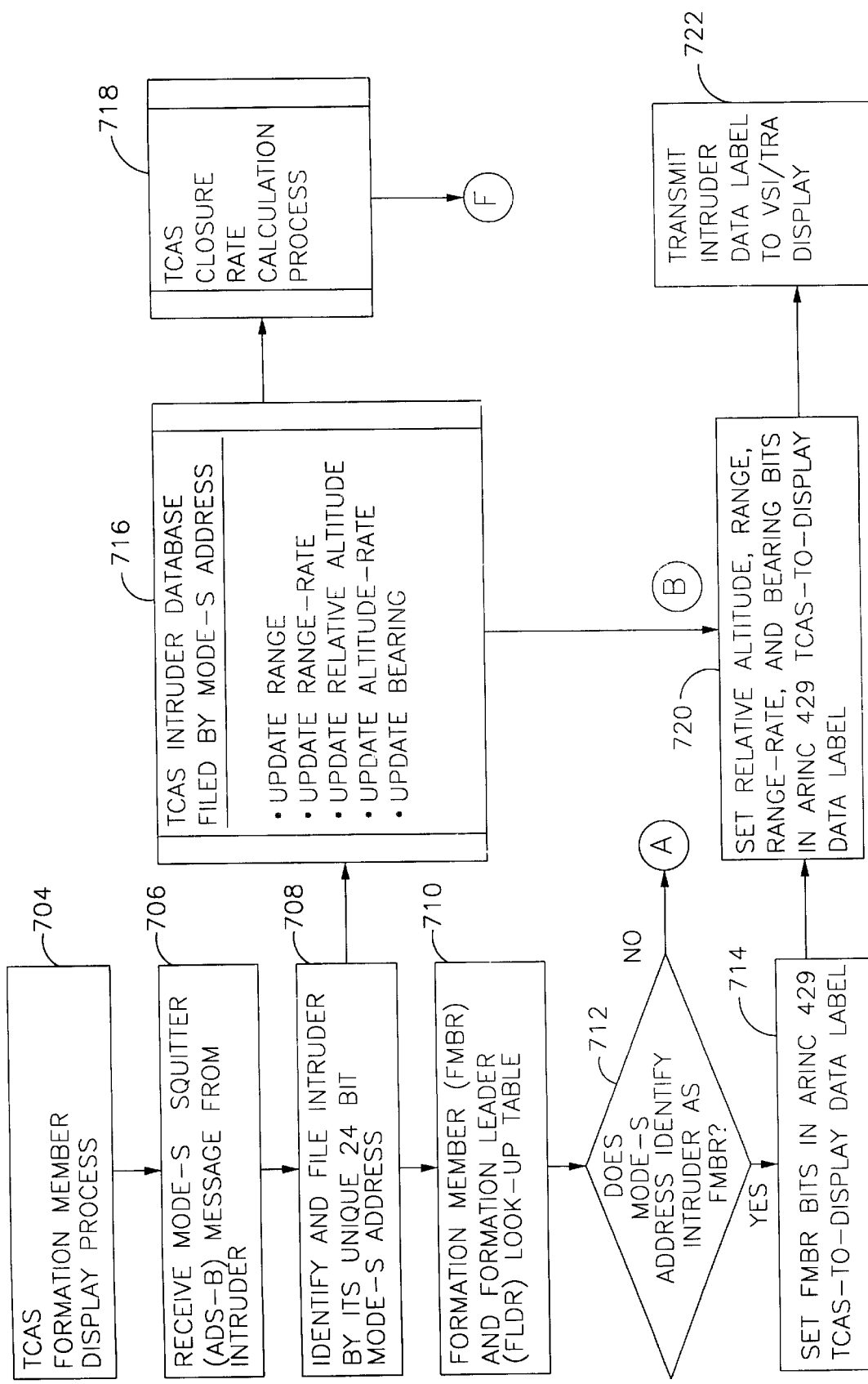
FIG. 7 is a flowchart of the methodology used to display information to the viewer in accordance with the present invention.
Figure 8:
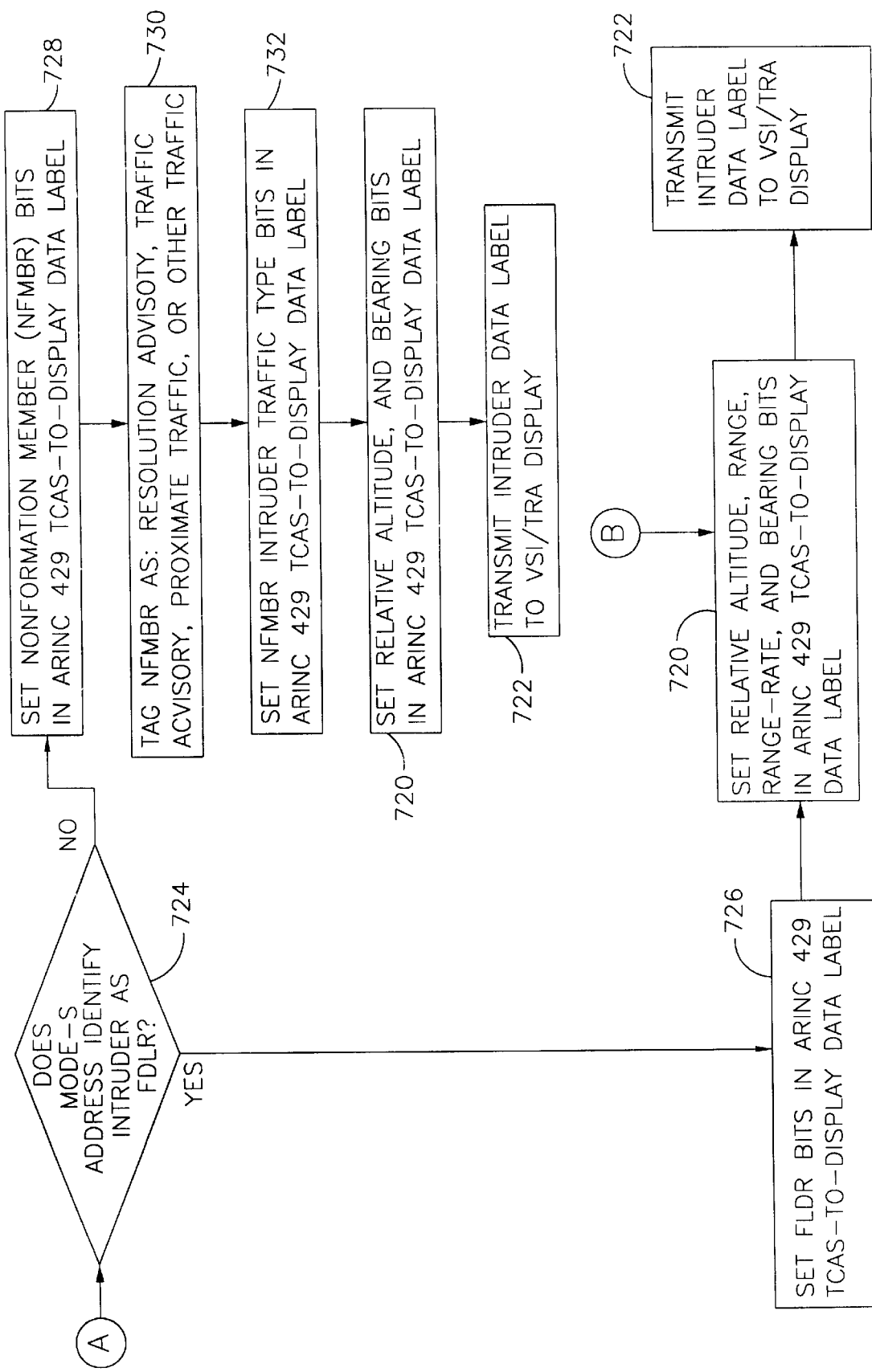
FIG. 8 is a flowchart of the methodology used to display information to the viewer in accordance with the present invention.
Figure 9:
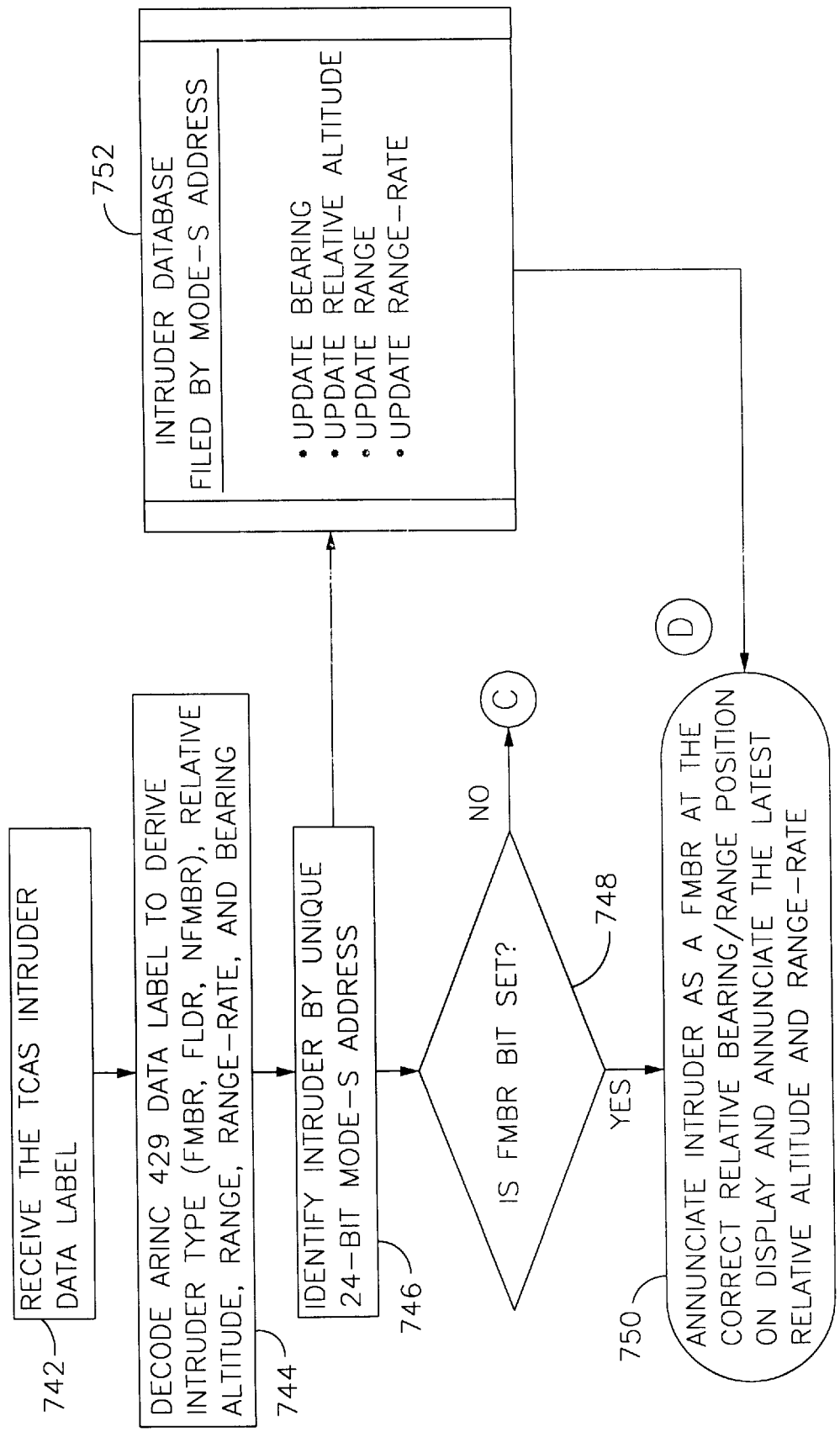
FIG. 9 is a flowchart of the methodology used to display information the to viewer in accordance with the present invention.
Figure 10A:
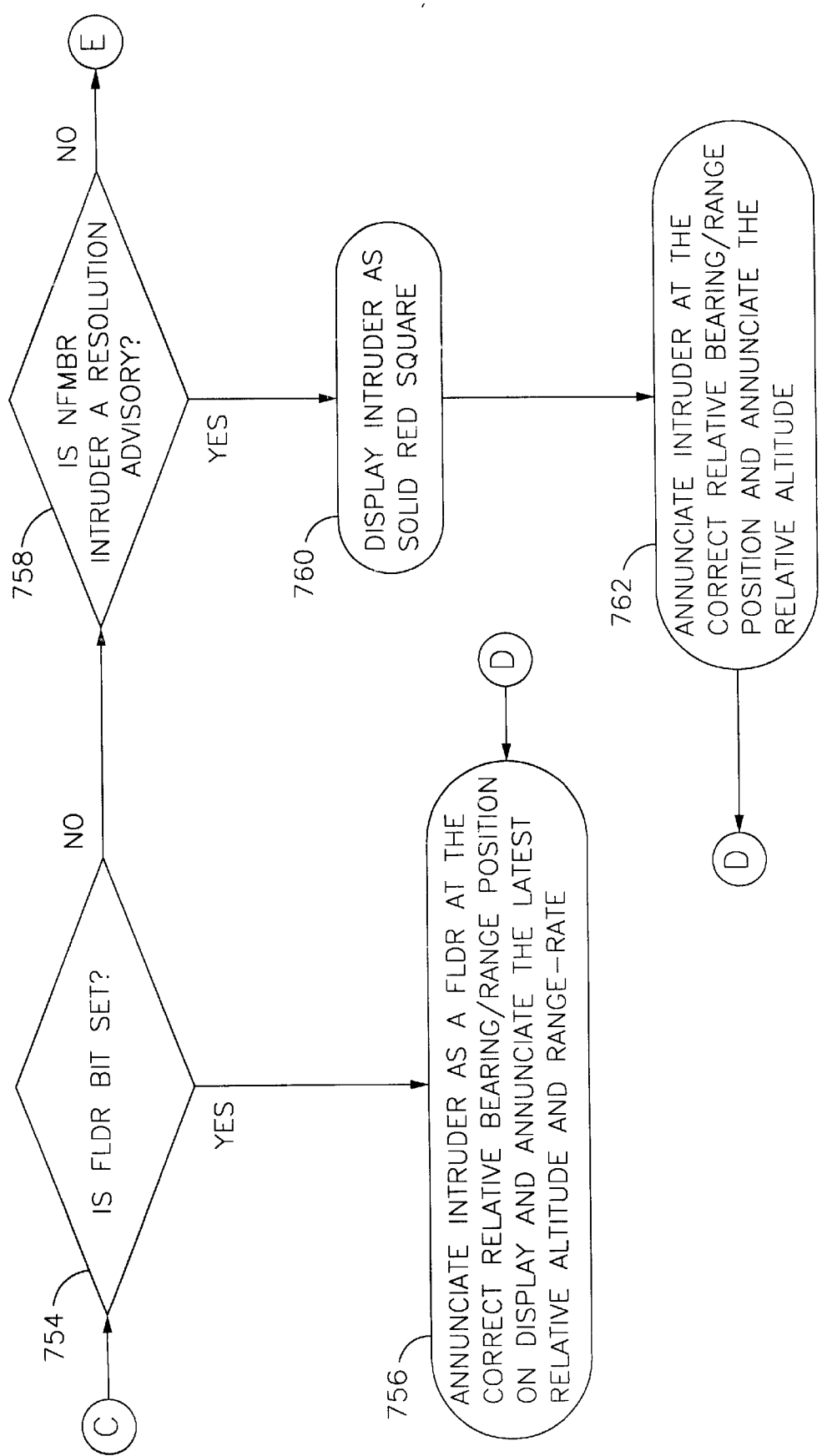
FIG. 10 is a flowchart of the methodology used to display information to the viewer in accordance with the present invention.
Figure 10B:
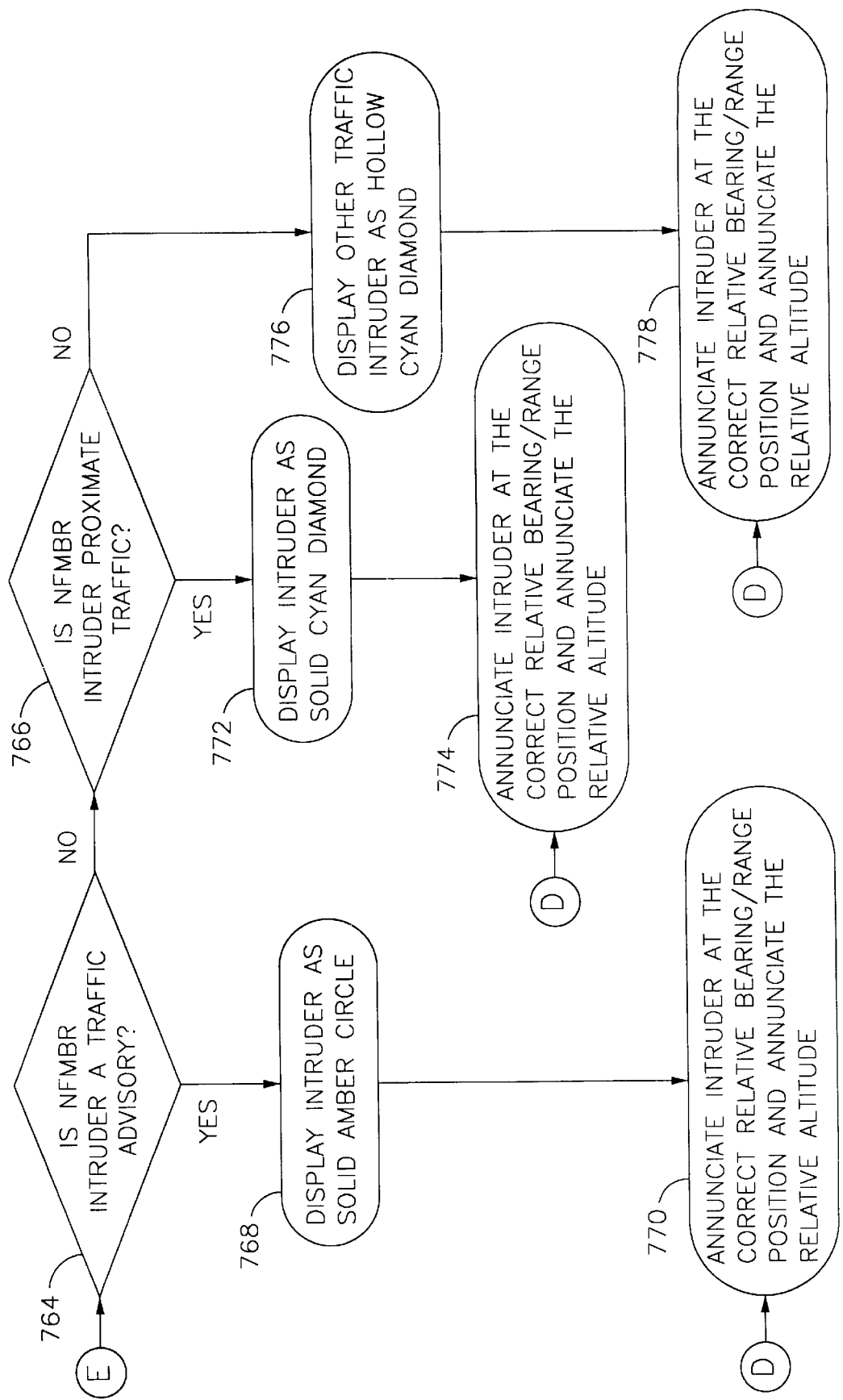

Referring to FIGS. 7 through 9, there is shown flowcharts of the information processing to determine the manner in which information is displayed to the aircraft flight crew on the display 600. In step 704, the process of displaying TCAS formation members is begun. In step 706, the TCAS computer of the lead or host aircraft receives Mode-S Squitter (ADS-B) message from an intruder to the protected volume. The VSI/TRA display provides pilots situational awareness of formation aircraft position and an audiovisual indication when an intruder penetrates a protected volume or meets some closure rate criteria within a protected volume. Intruder range quantization is filtered to provide resolution of, for example, 50 feet. The VSI/TRA display 600 includes appropriate-sized range ring 640 of approximately 500 feet and centered display with approximately 0.51-nmi range selection as shown in FIG. 6. In step 708, the intruder is identified by its unique 24-bit Mode-S address ID and stored for further processing. In step 710, the mission computer accesses a look-up table to determine whether the intruder is a formation member (FMBR) or a formation leader (FLDR) or non-formation member (NFMBR) or otherwise. In step 712, a decision is made as to whether the intruder is a formation member according to the Mode-S address ID. If the intruder is a FMBR, then certain bits, referred to herein as FMBR bits, in, for example, the ARINC 429 are set in step 714 and a TCAS-to-display data label is assigned. In step 720, the relative altitude, range, range rate, and bearing information are set in the ARINC 429 and a data label assigned. The intruder data label assigned in step 720 is then transmitted to the VSI/TRA display 600 in step 722. The information obtained in step 708 is also provided to step 716, which is a TCAS intruder database that can be arranged by an aircraft's Mode-S address ID. In step 716, the information is updated in the TCAS intruder database, specifically, the range, range rate, relative altitude, altitude rate, and the bearing of the intruder. The outputs of step 716 are provided to both steps 718 and 720. In step 718, the TCAS closure rate of the intruder is calculated after which it is sent to step 730 (FIG. 8) for further processing and presentation on display 600.

Referring again to step 712, a decision is made as to whether the intruder is a formation member according to the Mode-S address ID. If the intruder is not a FMBR, then another decision is made in step 724 as to whether the intruder is a FLDR. If the intruder is a FLDR, then the FLDR bits are set in the ARINC 429 in step 714 for processing in steps 720 and 722 as discussed earlier.

If the intruder is not a FLDR, then the non-formation member (NFMBR) bits are set in the ARINC 429 in step 728. In step 730, the NFMBR is identified or tagged as a resolution advisory, a traffic advisory, proximate traffic, or other traffic. These NFMBR bits are then set as NFMBR intruder traffic type bits in the ARINC 429. Then the information is processed in steps 720 and 722 as discussed earlier for transmission to the VSI/TRA display 600.

Referring to FIG. 9, the TCAS intruder data label information transmitted in step 722 is received in step 742 by the mission computer. In step 744, the TCAS intruder data label is decoded to derive the intruder type (i.e., FMBR, FLDR, NFMBR) in addition to its relative altitude, range, range rate, and bearing. The intruder is identified by its unique Mode-S address ID in step 746. The information is processed in step 748 to determine if the FMBR bit is set and in step 754 to determine if the FLDR bit is set. If the FMBR bit is set, then the intruder is annunciated on the display as a FMBR at the correct relative bearing/range position along with the most recent relative altitude and range rate in step 750. This information is processed along with information obtained from the intruder database in step 752. If the FMBR bit is not set, then a further decision is made in step 754. If the FLDR bit is set, then the intruder is annunciated on the display as a FLDR at the correct relative bearing/range position along with the most recent relative altitude and range rate in step 756 as obtained in part from step 752. This information is processed along with information obtained from the intruder database in step 752. If the FLDR bit is not set, then a further decision is made in step 758. If neither the FLDR bit nor the FMBR bit is set, then the intruder is a NFMBR. In step 758, if the NFMBR intruder is a resolution advisory, then the intruder is displayed on display 600 as, for example, a solid red square. Along with the solid red square is displayed the correct relative bearing/range position-and the relative altitude in step 762 as obtained in part from step 752. If the NFMBR intruder is not a resolution advisory, then a further decision is made in step 764 to determine whether the NFMBR intruder is a traffic advisory. In step 768, if the NFMBR intruder is a traffic advisory, then the intruder is displayed on display 600 as a solid amber circle as shown in FIG. 6 (numeral 630). Along with the solid amber circle is displayed the correct relative bearing/range position and the relative altitude in step 770 as obtained in part from step 752. If the NFMBR intruder is not a traffic advisory, then a further decision is made in step 766 to determine whether the NFMBR intruder is proximate traffic. If the NFMBR intruder is proximate traffic, then it is displayed as an intruder in step 772 as a solid cyan diamond as shown in FIG. 6 (e.g., numeral 620). Along with the solid cyan diamond is displayed the correct relative bearing/range position and the relative altitude in step 774 as obtained in part from step 752. If the NFMBR intruder is not proximate traffic, then a symbology is used in step 776 to display the intruder as other traffic intruder such as a hollow cyan diamond. Again, along with the hollow cyan diamond is displayed the correct relative bearing/range position and the relative altitude in step 778 as obtained in part from step 752.

Although there are numerous advantages realized by the TCAS system described herein, there are two major advantages of using passive surveillance for close formation aircraft separation.

The first major advantage is that the positional accuracy is substantially equivalent to the longitude and latitude positional accuracy associated with the aircraft's GPS navigational source. A relative aircraft bearing within 2° root mean square (rms) can be attained with the present invention. This is because TCAS calculates individual target cell position based upon ADS-B positional data transmitted from each aircraft. TCAS ADS-B operations enables processing of at least 50 targets. The number of targets displayed to the pilot will be based upon a prioritization scheme of number of aircraft within a specified horizontal range, bearing relative to the host aircraft, and relative altitude. The nominal aircraft target processing and display capability is a formation of 35 TCAS-equipped aircraft. The received TCAS ADS-B data could be transferred to the aircraft's mission computer via ARINC 429 data bus interface for further processing and generation of SKE steering commands to maintain aircraft horizontal and vertical separation within the cell. Processed ADS-B information that results in aircraft horizontal and vertical positioning would be directly or indirectly coupled to the autopilot or SKE via the Flight Management Computer (FMC).

The second major advantage is that passive surveillance reduces RF emissions and contributes to minimizing probability of detection. TCAS interrogations are not required to establish the relative position of aircraft squittering ADS-B data. GPS squitter data is emitted at random intervals uniformly distributed over a range, for example, from 0.4 to 0.6 seconds. The Honeywell XS-950 transponder contains ARINC 429 interfaces reserved for inputting longitude, latitude, airspeed, magnetic heading, intended flight path, and flight number identification. Most of these parameters are provided via Global Positioning System Navigation Satellite System (GNSS) and Flight Management System (FMS). Barometric altitude, however, would be derived by the on-board Air Data Computer (ADC 340) via the Mode-S transponder interface.

Other variations and modifications of the present invention will be apparent to those of skill in the art, and it is the intent of the appended claims that such variations and modifications be covered. For example, the antenna mounting technique taught in U.S. Pat. No. 5,805,111 could be implemented in the present invention to extend TCAS detection range. The particular values and configurations discussed above can be varied and are cited merely to illustrate a particular embodiment of the present invention and are not intended to limit the scope of the invention. It is contemplated that the use of the present invention can involve components having different characteristics as long as the principle, the presentation of a passive TCAS and Mode-S transponder in communication is followed. The present invention applies to almost any CAS system and is not limited to use by TCAS. It is intended that the scope of the present invention be defined by the claims appended hereto.

The embodiments of an invention in which an exclusive property or right is claimed are defined as follows:

1. A system for collision avoidance in formation flight, the system comprising:

data link transponder means, in a first aircraft, for receiving broadcast data comprising position information and identification information of a second aircraft; and traffic alert and collision avoidance system (TCAS) computer means, in the first aircraft, for communicating with said data link transponder means; for processing the received broadcast data to determine relative aircraft position of the first and second aircraft; and for suppressing at least one of traffic advisories and resolution advisories when the identification information is associated with a formation member.

2. The system of claim 1, wherein the TCAS computer means inhibits transmission of traffic advisory interrogations.

3. The system of claim 1, further comprising means, in the first aircraft, for displaying relative aircraft position of the first and second aircraft to an operator of the first aircraft.

4. The system of claim 3, wherein the means for displaying is further for displaying relative velocity of the second aircraft.

5. The system of claim 1, wherein said data link transponder means supports a mode-select data link.

6. The system of claim 1, wherein the broadcast data comprises automatic dependent surveillance broadcast (ADS-B) data.

7. The system of claim 1, wherein the broadcast data comprises global positioning system data.

8. The system of claim 1, wherein the broadcast data comprises Mode-S squitter data.

9. The system of claim 1, wherein the broadcast data comprises extended squitter airborne position data.

10. The system of claim 1, wherein the broadcast data comprises extended squitter airborne velocity data.

11. The system of claim 1, wherein the TCAS computer means is further for updating relative aircraft position of the second aircraft in accordance with further position information received by the data link transponder means.

12. The system of claim 1, wherein:

the data link transponder means is further for transmitting second broadcast data comprising position information of the first aircraft and identification of the first aircraft; and the TCAS computer means is further for attenuating transmitting of the second broadcast data.

13. The system of claim 1 further comprising mission computer means, in the first aircraft, for generating steering commands for maintaining separation between the first aircraft and the second aircraft in accordance with data received from the TCAS computer means, the data comprising relative aircraft position of the first and the second aircraft.

14. A method for collision avoidance in formation flight, the method comprising:

a step for receiving, on a first aircraft, broadcast data comprising identification and position of a second aircraft;

a step for determining position of the first aircraft from received navigation data;

a step for determining relative aircraft position of the first and second aircraft in accordance with the position of the second aircraft and position of the first aircraft;

a step for determining whether identification of the second aircraft corresponds to identification of a formation member; and a step for suppressing at least one of traffic advisories and resolution advisories when the identification of the second aircraft corresponds to identification of a formation member.

15. The method of claim 14 further comprising:

a step for positioning the second aircraft with respect to the first aircraft based on the broadcast data.

16. The method of claim 14 further comprising:

a step for processing the broadcast data from the TCAS computer in a mission computer; and a step for transmitting a result of processing by the mission computer.

17. The method of claim 16 the result of processing by the mission computer comprises a steering command for maintaining a separation between the first aircraft and the second aircraft.

18. The method of claim 16 wherein identification of the second aircraft comprises at least one of a Mode-S address and a flight identification.

19. The method of claim 14, further comprising:

a step for alerting an operator of the first aircraft when an intruder penetrates a predefined perimeter of the first and second aircraft flying in formation.

20. The method of claim 14, further comprising:

a step for inhibiting transmitting of air traffic control radar beacon system messages when in formation flight.

21. The method of claim 14, further comprising:

a step for calculating target range, range rate, relative altitude, altitude rate, and bearing from the received broadcast data to determine whether an intruder aircraft is intruding upon a predefined airspace of the first aircraft.

22. A system for collision avoidance in formation flight, the system on a first aircraft, the system comprising;

a. a data link transponder that receives broadcast data from a second aircraft, the broadcast data comprising indicia of position of the second aircraft and indicia of identification of the second aircraft;

b. a navigation aid that provides indicia of current position of the first aircraft; and c. a traffic alert and collision avoidance computer coupled to the data link transponder and to the navigation aid, the computer for determining relative aircraft position of the first and second aircraft in accordance with the indicia of position of the second aircraft and the indicia of current position of the first aircraft, and for suppressing at least one of traffic advisories an resolution advisories when the indicia of identification of the second aircraft corresponds to identification of a formation member.

23. The system of claim 22 wherein:

a. the system further comprises means for transmitting traffic advisory interrogations; and b. the computer is further coupled to the means for transmitting, to inhibit transmitting of traffic interrogations.

24. The system of claim 22 further comprising a display that displays position of the second aircraft and current position of the first aircraft.

25. The system of claim 24 wherein the display further displays relative velocity of the second aircraft.

26. The system of claim 22 wherein the data link transponder comprises a mode-select data link transponder.

27. The system of claim 22 wherein the broadcast data comprises automatic dependent surveillance broadcast data.

28. The system of claim 22 wherein the broadcast data comprises global positioning system data.

29. The system of claim 22 wherein the broadcast data comprises Mode-S squitter data.

30. The system of claim 22 wherein the broadcast data comprises extended squitter airborne position data.

31. The system of claim 22 wherein the broadcast data comprises extended squitter airborne velocity data.

32. The system of claim 22 wherein the computer updates relative aircraft position of the second aircraft in accordance with further indicia of position of the second aircraft received by the data link transponder.

33. The system of claim 23 wherein the data link transponder transmits second broadcast data comprising indicia of position of the first aircraft and indicia of identification of the first aircraft.

34. The system of claim 33 wherein the data link transponder comprises a step attenuator for transmitting at reduced power as directed by the computer.

35. The system of claim 22 further comprising a mission computer that generates steering commands for maintaining separation between the first aircraft and the second aircraft in accordance with data received from the traffic alert and collision avoidance computer, the data comprising relative aircraft position of the first and second aircraft.

36. The system of claim 22 wherein:
   a. the system further comprises a mission computer, coupled to the traffic alert and collision avoidance computer; and
   b. the traffic alert and collision avoidance computer suppresses advisories in accordance with a determination by the mission computer that indicia of identification of the second aircraft corresponds to identification of a formation member.

37. The system of claim 22 wherein the navigation aid comprises a global positioning system and an inertial navigation system.

38. The system of claim 22 wherein the indicia of identification of the second aircraft comprises a Mode-S address.

39. The system of claim 22 wherein the indicia of identification of the second aircraft comprises flight identification.

40. A method for collision avoidance in formation flight, the method comprising:
   providing indicia of position of the second aircraft and indicia of identification of the second aircraft by receiving broadcast data from a second aircraft and determining the indicia of position and the indicia of identification from the broadcast data;
   providing indicia of current position of the first aircraft by receiving navigation data from a navigation aid and determining the indicia of current position from the navigation data;
   displaying relative position of the first and second aircraft by determining relative aircraft position of the first and second aircraft in accordance with the indicia of position of the second aircraft and the indicia of current position of the first aircraft;
   determining whether indicia of identification of the second aircraft corresponds to identification of a formation member by referring to a table of identifications; and
   reducing radio frequency transmissions by suppressing at least one of traffic advisories and resolution advisories when the indicia of identification of the second aircraft corresponds to identification of a formation member.

41. The method of claim 40 further comprising:
   maintaining separation between the first and second aircraft by transmitting a steering command to the second aircraft, the steering command in accordance with the determined relative aircraft position of the first and the second aircraft.

42. The method of claim 40 further comprising:
   reducing radio frequency transmissions by inhibiting transmitting traffic interrogations while in formation flight.

43. The method of claim 40 further comprising
   reducing radio frequency transmissions by inhibiting transmitting air traffic control radar beacon system messages while in formation flight.

44. The method of claim 40 further comprising:
   alerting an operator of the first aircraft of the position of the second aircraft by displaying position of the second aircraft and current position of the first aircraft.

45. The method of claim 44 wherein displaying further comprises displaying relative velocity of the second aircraft.

46. The method of claim 40 wherein receiving broadcast data from a second aircraft comprises receiving automatic dependent surveillance broadcast data.

47. The method of claim 40 wherein receiving broadcast data from a second aircraft comprises receiving global positioning system data.

48. The method of claim 40 wherein receiving broadcast data from a second aircraft comprises receiving Mode-S squitter data.

49. The method of claim 40 wherein receiving broadcast data from a second aircraft comprises receiving extended squitter airborne position data.

50. The method of claim 40 wherein receiving broadcast data from a second aircraft comprises receiving extended squitter airborne velocity data.

51. The method of claim 40 further comprising:
   transmitting indicia of position of the first aircraft and indicia of identification of the first aircraft by transmitting automatic dependent surveillance broadcast data.

52. The method of claim 40 further comprising:
   transmitting indicia of position of the first aircraft and indicia of identification of the first aircraft by transmitting global positioning system data.

53. The method of claim 40 further comprising:
   transmitting indicia of position of the first aircraft and indicia of identification of the first aircraft by transmitting Mode-S squitter data.

54. The method of claim 53 wherein transmitting Mode-S squitter data comprises transmitting at reduced poser via a step attenuator when in formation flight.

55. The method claim 40 further comprising:
   transmitting indicia of position of the first aircraft of identification of the first aircraft by transmitting extended squitter airborne position data.

56. The method of claim 40 further comprising:
   transmitting indicia of position of the first aircraft and indicia of identification of the first aircraft by transmitting extended squitter airborne velocity data.

57. The method of claim 40 wherein providing indicia of identification of the second aircraft is further accomplished by determining a Mode-S address from received broadcast data.

58. The method of claim 40 wherein providing indicia of identification of the second aircraft is further accomplished by determining a flight identification from received broadcast data.

* * * * *